(12) United States Patent
Yasmin et al.

(10) Patent No.: US 12,539,782 B2
(45) Date of Patent: Feb. 3, 2026

(54) CHARGING AUTHENTICATION METHOD AND APPARATUS

(71) Applicant: Shenzhen Yinwang Intelligent Technologies Co., Ltd., Shenzhen (CN)

(72) Inventors: Rehana Yasmin, Singapore (SG); Yanjiang Yang, Singapore (SG); Songlie Zhan, Dongguan (CN); Zhuo Wei, Singapore (SG)

(73) Assignee: SHENZHEN YINWANG INTELLIGENT TECHNOLOIGES CO., LTD., Shenzhen (CN)

( * ) Notice: Subject to any disclaimer, the term of this patent is extended or adjusted under 35 U.S.C. 154(b) by 686 days.

(21) Appl. No.: 17/965,906

(22) Filed: Oct. 14, 2022

(65) Prior Publication Data

US 2023/0030673 A1 Feb. 2, 2023

Related U.S. Application Data

(63) Continuation of application No. PCT/CN2021/072430, filed on Jan. 18, 2021.

(30) Foreign Application Priority Data

Apr. 15, 2020 (CN) .......................... 202010296590.2

(51) Int. Cl.
*B60L 53/66* (2019.01)
*B60L 53/65* (2019.01)
*H04L 9/40* (2022.01)

(52) U.S. Cl.
CPC ............. *B60L 53/665* (2019.02); *B60L 53/65* (2019.02); *H04L 63/0823* (2013.01)

(58) Field of Classification Search
CPC ...... B60L 53/665; B60L 53/65; B60L 53/305; B60L 53/66; B60L 53/68; H04L 63/0823
See application file for complete search history.

(56) References Cited

U.S. PATENT DOCUMENTS

| | | | |
|---|---|---|---|
| 7,698,078 B2 * | 4/2010 | Kelty | .................... B60L 53/305 702/182 |
| 8,421,592 B1 * | 4/2013 | Gunasekara | ............ B60L 53/63 340/5.74 |

(Continued)

FOREIGN PATENT DOCUMENTS

| | | |
|---|---|---|
| CN | 1731890 A | 2/2006 |
| CN | 101116284 A | 1/2008 |

(Continued)

OTHER PUBLICATIONS

ISO 15118-2, Road vehicles—Vehicle-to-Grid Communication Interface—Part 2: Network and application protocol requirements, Apr. 1, 2014, total 350 pages.

*Primary Examiner* — Jared Fureman
(74) *Attorney, Agent, or Firm* — Conley Rose, P.C.

(57) ABSTRACT

A charging authentication method is performed by an electric vehicle and comprises establishing a first connection between the electric vehicle and a charging spot using a controller area network (CAN) bus, establishing a second connection between the electric vehicle and a charging management system using a mobile communication network, sending a charging request message to the charging spot using the first connection, and performing identity authentication and key negotiation with the charging spot using the second connection and a third connection between the charging spot and the charging management system.

20 Claims, 9 Drawing Sheets

(56) References Cited

U.S. PATENT DOCUMENTS

| | | | |
|---|---|---|---|
| 8,996,876 B2 | 3/2015 | Outwater et al. | |
| 10,949,843 B2* | 3/2021 | Mouftah | H04L 9/3234 |
| 11,140,001 B2* | 10/2021 | Bode | H04L 12/56 |
| 11,715,138 B2* | 8/2023 | Khoo | H04W 4/023 |
| | | | 700/286 |
| 11,727,106 B2* | 8/2023 | Shin | B60L 53/66 |
| | | | 713/168 |
| 11,858,369 B2* | 1/2024 | Books | B60L 53/53 |
| 12,427,884 B2* | 9/2025 | Shin | B60L 53/66 |
| 2007/0192602 A1 | 8/2007 | Blom et al. | |
| 2015/0113275 A1 | 4/2015 | Kim et al. | |
| 2015/0202974 A1* | 7/2015 | Rub | B60L 53/31 |
| | | | 320/109 |
| 2018/0272886 A1 | 9/2018 | Stocker et al. | |
| 2019/0118667 A1* | 4/2019 | Sakuma | H04W 12/06 |

FOREIGN PATENT DOCUMENTS

| | | |
|---|---|---|
| CN | 103595097 A | 2/2014 |
| CN | 204068319 U | 12/2014 |
| CN | 105882437 A | 8/2016 |
| CN | 106910288 A | 6/2017 |
| CN | 107786548 A | 3/2018 |
| CN | 107801187 A | 3/2018 |
| CN | 108544933 A | 9/2018 |
| CN | 109849728 A | 6/2019 |
| CN | 110519726 A | 11/2019 |
| DE | 102012014456 A1 | 1/2014 |
| DE | 102014212415 A1 | 12/2015 |
| JP | 2019079346 A | 5/2019 |
| WO | 2017029424 A1 | 2/2017 |
| WO | 2018166422 A1 | 9/2018 |

* cited by examiner

```
S401: An electric vehicle sends a charging request to a charging spot
by using a first connection
```

```
S402: The electric vehicle performs identity authentication and key
negotiation with the charging spot by using a second connection and
a third connection between the charging spot and a charging
management system
```

S501: A charging spot receives, by using a first connection, a charging request sent by a charging spot S502: The charging spot performs identity authentication and key negotiation with the electric vehicle by using a third connection and a second connection between the electric vehicle and a charging management system

FIG. 5

CHARGING AUTHENTICATION METHOD AND APPARATUS

CROSS-REFERENCE TO RELATED APPLICATIONS

This application is a continuation application of International Patent Application No. PCT/CN2021/072430, filed on Jan. 18, 2021, which claims priority to Chinese Patent Application No. 202010296590.2, filed on Apr. 15, 2020. The disclosures of the aforementioned applications are hereby incorporated by reference in their entireties.

TECHNICAL FIELD

This application relates to the field of Internet of vehicles, and more specifically, to a charging authentication method and apparatus.

BACKGROUND

An electric vehicle (EV) is a most important new energy vehicle in the future. A charging system of the electric vehicle includes at least the electric vehicle, a charging spot (CS), and a charging management system (CMS). The charging management system is a centralized and trusted service system for managing the charging spot and charging payment. Information security is critical for an electric vehicle connected to the Internet. In a process in which the electric vehicle is charged at a public charging spot, both the electric vehicle and the charging spot may be attacked. Consequently, communication between the electric vehicle and the charging spot is tampered with or information between the electric vehicle and the charging spot is leaked.

SUMMARY

This application provides a charging authentication method and apparatus, to improve security of communication between an electric vehicle and a charging spot.

According to a first aspect, a charging authentication method is provided, where the method is performed by an electric vehicle, a first connection is established between the electric vehicle and a charging spot by using a controller area network (CAN) bus, a second connection is established between the electric vehicle and a charging management system by using a mobile communication network, and the method includes: The electric vehicle sends a charging request message to the charging spot by using the first connection; and the electric vehicle performs identity authentication and key negotiation with the charging spot by using the second connection and a third connection between the charging spot and the charging management system.

A bandwidth of the CAN is extremely limited. As a result, when communication is performed between the electric vehicle and the charging spot by using the CAN bus, it is difficult to send a large amount of data by using the CAN bus. In the method in this embodiment of this application, the charging management system forwards a message between the electric vehicle and the charging spot that are connected by using the CAN bus. This can resolve a problem that the bandwidth of the CAN bus is insufficient. In addition, identity authentication and key negotiation are performed between the electric vehicle and the charging spot. This can improve security of information transmission between the electric vehicle and the charging spot.

With reference to the first aspect, in a possible implementation, that the electric vehicle performs identity authentication and key negotiation with the charging spot by using the second connection and a third connection between the charging spot and the charging management system includes: The electric vehicle sends identity information of the electric vehicle to the charging spot by using the first connection; the electric vehicle receives identity information of the charging spot, where the identity information of the charging spot is forwarded by the charging management system by using the second connection; the electric vehicle sends first key information to the charging spot, where the first key information is forwarded by the charging management system by using the third connection, and the first key information includes a first key; the electric vehicle receives second key information sent by the charging spot, where the second key information is forwarded by the charging management system by using the second connection, and the second key information includes a second key; and the electric vehicle determines a third key based on the first key and the second key, where the third key is a key common to the electric vehicle and the charging spot, and the third key is used to encrypt a message between the electric vehicle and the charging spot.

The bandwidth of the CAN is extremely limited. As a result, when communication is performed between the electric vehicle and the charging spot by using the CAN bus, it is difficult to send a large amount of data by using the CAN bus. In the method in this embodiment of this application, the charging management system forwards the message between the electric vehicle and the charging spot that are connected by using the CAN bus. This can resolve a problem that the bandwidth of the CAN bus is insufficient. The electric vehicle and the charging spot may obtain a key agreed on through negotiation, and the key may be used to protect subsequent communication between the electric vehicle and the charging spot.

With reference to the first aspect, in a possible implementation, the second key information further includes a digital signature of the charging spot.

With reference to the first aspect, in a possible implementation, the electric vehicle receives the second key information sent by the charging spot, where the digital signature of the charging spot in the second key information is replaced with a digital signature of the charging management system.

Before the electric vehicle and the charging spot mutually verify the digital signature, a digital certificate needs to be verified first, workload of verifying the digital certificate is large, and the electric vehicle and the charging spot generally already know a public key of the charging management system. Therefore, the electric vehicle and the charging spot do not need to verify the digital certificate of the charging management system, so that workload can be reduced.

According to a second aspect, a charging authentication method is provided, where the method is performed by a charging spot, a first connection is established between the charging spot and an electric vehicle by using a CAN bus, a third connection is established between the charging spot and a charging management system by using a mobile communication network, and the method includes: The charging spot receives, by using the first connection, a charging request message sent by the electric vehicle; and the charging spot performs identity authentication and key negotiation with the electric vehicle by using the third connection and a second connection between the electric vehicle and the charging management system.

With reference to the second aspect, in a possible implementation, that the charging spot performs identity authentication and key negotiation with the electric vehicle by using the third connection and a second connection between the electric vehicle and the charging management system includes: The charging spot receives, by using the first connection, identity information of the electric vehicle that is sent by the electric vehicle; the charging spot sends identity information of the charging spot, where the identity information of the charging spot is forwarded by the charging management system by using the second connection; the charging spot receives first key information sent by the electric vehicle, where the first key information is forwarded by the charging management system by using the third connection, and the first key information includes a first key; the charging spot sends second key information to the electric vehicle, where the second key information is forwarded by the charging management system by using the second connection, and the second key information includes a second key; and the charging spot determines a third key based on the first key and the second key, where the third key is a key common to the electric vehicle and the charging spot, and the third key is used to encrypt a message between the electric vehicle and the charging spot.

With reference to the second aspect, in a possible implementation, the first key information further includes a digital signature of the electric vehicle.

With reference to the second aspect, in a possible implementation, after the charging spot receives the first key information sent by the electric vehicle, the method further includes: The charging spot successfully verifies the digital signature of the electric vehicle.

With reference to the second aspect, in a possible implementation, the charging spot receives the first key information sent by the electric vehicle, where the digital signature of the electric vehicle in the first key information is replaced with a digital signature of the charging management system.

According to a third aspect, a charging authentication method is provided, where the method is performed by a charging management system, a second connection is established between the charging management system and an electric vehicle by using a mobile communication network, a third connection is established between the charging management system and a charging spot by using the mobile communication network, a first connection is established between the electric vehicle and the charging spot by using a CAN bus, and the method includes: The charging management system forwards an identity authentication message and a key negotiation message between the electric vehicle and the charging spot by using the second connection and the third connection.

With reference to the third aspect, in a possible implementation, that the charging management system forwards an identity authentication message and a key negotiation message between the electric vehicle and the charging spot by using the second connection and the third connection includes: The charging management system receives identity information of the charging spot by using the third connection; the charging management system sends the identity information of the charging spot to the electric vehicle by using the second connection; the charging management system receives, by using the second connection, first key information sent by the electric vehicle, where the first key information includes a first key; the charging management system sends the first key information to the charging spot by using the third connection; the charging management system receives, by using the third connection, second key information sent by the charging spot, where the second key information includes a second key; and the charging management system sends the second key information to the electric vehicle by using the second connection, so that the electric vehicle and the charging spot determine a third key based on the first key and the second key, where the third key is a key common to the electric vehicle and the charging spot, and the third key is used to encrypt a message between the electric vehicle and the charging spot.

With reference to the third aspect, in a possible implementation, before the charging management system sends the identity information of the charging spot to the electric vehicle by using the second connection, the method further includes: The charging management system successfully verifies the identity information of the charging spot.

With reference to the third aspect, in a possible implementation, the first key information further includes a digital signature of the electric vehicle.

With reference to the third aspect, in a possible implementation, before the charging management system sends the first key information to the charging spot by using the third connection, the method further includes: The charging management system successfully verifies the digital signature of the electric vehicle; and the charging management system replaces the digital signature of the electric vehicle with a digital signature of the charging management system.

With reference to the third aspect, in a possible implementation, the second key information further includes a digital signature of the charging spot.

With reference to the third aspect, in a possible implementation, before the charging management system sends the second key information to the electric vehicle by using the second connection, the method further includes: The charging management system successfully verifies the digital signature of the charging spot; and the charging management system replaces the digital signature of the charging spot with the digital signature of the charging management system.

According to a fourth aspect, a charging authentication apparatus is provided, where the apparatus is mounted in an electric vehicle, a first connection is established between the apparatus and a charging spot by using a CAN bus, a second connection is established between the apparatus and a charging management system by using a mobile communication network, and the apparatus includes: a transceiver module, configured to send a charging request message to the charging spot by using the first connection; and a processing module, where the processing module and the transceiver module are further configured to perform identity authentication and key negotiation with the charging spot by using the second connection and a third connection between the charging spot and the charging management system.

With reference to the fourth aspect, in a possible implementation, that the processing module and the transceiver module are further configured to perform identity authentication and key negotiation with the charging spot by using the second connection and a third connection between the charging spot and the charging management system includes: The transceiver module is configured to send identity information of the electric vehicle to the charging spot by using the first connection; the transceiver module is further configured to receive identity information of the charging spot, where the identity information of the charging spot is forwarded by the charging management system by using the second connection; the transceiver module is further configured to send first key information to the charging spot, where the first key information is forwarded by the charging management system by using the third connection, and the first key information includes a first key; the transceiver module is further configured to receive second key information sent by the charging spot, where the second key information is forwarded by the charging management system by using the second connection, and the second key information includes a second key; and the processing module is configured to determine a third key based on the first key and the second key, where the third key is a key common to the electric vehicle and the charging spot, and the third key is used to encrypt a message between the electric vehicle and the charging spot.

With reference to the fourth aspect, in a possible implementation, the second key information further includes a digital signature of the charging spot.

With reference to the fourth aspect, in a possible implementation, after the transceiver module receives the second key information sent by the charging spot, the processing module is further configured to successfully verify the digital signature of the charging spot.

With reference to the fourth aspect, in a possible implementation, the transceiver module receives the second key information sent by the charging spot, where the digital signature of the charging spot in the second key information is replaced with a digital signature of the charging management system.

According to a fifth aspect, a charging authentication apparatus is provided, where the apparatus is mounted in a charging spot, a first connection is established between the apparatus and an electric vehicle by using a CAN bus, a third connection is established between the apparatus and a charging management system by using a mobile communication network, and the apparatus includes: a transceiver module, configured to receive, by using the first connection, a charging request message sent by the electric vehicle; and a processing module, where the processing module and the transceiver module are further configured to perform identity authentication and key negotiation with the electric vehicle by using the third connection and a second connection between the electric vehicle and the charging management system.

With reference to the fifth aspect, in a possible implementation, that the processing module and the transceiver module are further configured to perform identity authentication and key negotiation with the electric vehicle by using the third connection and a second connection between the electric vehicle and the charging management system includes: The transceiver module is configured to receive, by using the first connection, identity information of the electric vehicle that is sent by the electric vehicle; the transceiver module is further configured to send identity information of the charging spot, where the identity information of the charging spot is forwarded by the charging management system by using the second connection; the transceiver module is further configured to receive first key information sent by the electric vehicle, where the first key information is forwarded by the charging management system by using the third connection, and the first key information includes a first key; the transceiver module is further configured to send second key information to the electric vehicle, where the second key information is forwarded by the charging management system by using the second connection, and the second key information includes a second key; and the processing module is configured to determine a third key based on the first key and the second key, where the third key is a key common to the electric vehicle and the charging spot, and the third key is used to encrypt a message between the electric vehicle and the charging spot.

With reference to the fifth aspect, in a possible implementation, the first key information further includes a digital signature of the electric vehicle.

With reference to the fifth aspect, in a possible implementation, after the transceiver module receives the first key information sent by the electric vehicle, the processing module is further configured to successfully verify the digital signature of the electric vehicle.

With reference to the fifth aspect, in a possible implementation, the transceiver module receives the first key information sent by the electric vehicle, where the digital signature of the electric vehicle in the first key information is replaced with a digital signature of the charging management system.

According to a sixth aspect, a charging authentication apparatus is provided, where the apparatus is mounted in a charging management system, a second connection is established between the apparatus and an electric vehicle by using a mobile communication network, a third connection is established between the apparatus and a charging spot by using the mobile communication network, a first connection is established between the electric vehicle and the charging spot by using a controller area network CAN bus, and the apparatus includes: a transceiver module, configured to forward an identity authentication message and a key negotiation message between the electric vehicle and the charging spot by using the second connection and the third connection.

With reference to the sixth aspect, in a possible implementation, that the transceiver module forwards an identity authentication message and a key negotiation message between the electric vehicle and the charging spot by using the second connection and the third connection includes: The transceiver module is further configured to receive identity information of the charging spot by using the third connection; the transceiver module is further configured to send the identity information of the charging spot to the electric vehicle by using the second connection; the transceiver module is further configured to receive, by using the second connection, first key information sent by the electric vehicle, where the first key information includes a first key; the transceiver module is further configured to send the first key information to the charging spot by using the third connection; the transceiver module is further configured to receive, by using the third connection, second key information sent by the charging spot, where the second key information includes a second key; and the transceiver module is further configured to send the second key information to the electric vehicle by using the second connection, so that the electric vehicle and the charging spot determine a third key based on the first key and the second key, where the third key is a key common to the electric vehicle and the charging spot, and the third key is used to encrypt a message between the electric vehicle and the charging spot.

With reference to the sixth aspect, in a possible implementation, before the transceiver module sends the identity information of the charging spot to the electric vehicle by using the second connection, the apparatus further includes a processing module, configured to successfully verify the identity information of the charging spot.

With reference to the sixth aspect, in a possible implementation, the first key information further includes a digital signature of the electric vehicle.

Before the transceiver module sends the first key information to the charging spot by using the third connection, the apparatus further includes the processing module, configured to successfully verify the digital signature of the electric vehicle; and the processing module is further configured to replace the digital signature of the electric vehicle with a digital signature of the charging management system.

With reference to the sixth aspect, in a possible implementation, the second key information further includes a digital signature of the charging spot.

With reference to the sixth aspect, in a possible implementation, before the transceiver module sends the second key information to the electric vehicle by using the second connection, the apparatus further includes the processing module, used by the charging management system to successfully verify the digital signature of the charging spot; and the processing module is further configured to replace the digital signature of the charging spot with the digital signature of the charging management system.

According to a seventh aspect, a charging authentication apparatus is provided, where the apparatus includes a memory and a processor, a memory stores code and data, the memory is coupled to the processor, and the processor runs the code in the memory, to enable the apparatus to perform the method in any one of the first aspect or the implementations of the first aspect, any one of the second aspect or the implementations of the second aspect, and any one of the third aspect or the implementations of the third aspect.

According to an eighth aspect, a computer-readable storage medium is provided, where the computer-readable storage medium stores instructions, and when the instructions are executed, the method in any one of the first aspect or the implementations of the first aspect, any one of the second aspect or the implementations of the second aspect, and any one of the third aspect or the implementations of the third aspect is performed.

According to a ninth aspect, a computer program product is provided, including instructions, where when the computer program product is run on a computer, the computer is enabled to perform the method in any one of the first aspect or the implementations of the first aspect, any one of the second aspect or the implementations of the second aspect, and any one of the third aspect or the implementations of the third aspect.

BRIEF DESCRIPTION OF DRAWINGS

FIG. 5 is a schematic flowchart of another charging authentication method according to an embodiment of this application;

DESCRIPTION OF EMBODIMENTS

The following describes technical solutions of this application with reference to accompanying drawings.

There are generally two payment manners when an electric vehicle is charged at a public charging spot. One manner is on-site payment, that is, after charging ends, fees are paid by using cash, a credit card, a prepaid card, a mobile phone application (WECHAT PAY or ALIPAY), and the like. The other manner is billing payment, that is, an amount of spent money is recorded in an account of a user, and is settled periodically.

In a process in which the electric vehicle is charged at the public charging spot, many security problems may exist in communication between the electric vehicle and the charging spot. For example, a malicious electric vehicle may attack a charging management system by using the charging spot; a malicious electric vehicle may transfer charging fees to another account through identity forgery; in case of billing payment, a malicious electric vehicle may deny a charging transaction; a malicious charging spot may attack the electric vehicle; with a malicious charging spot and a malicious electric vehicle, an identity of an authorized electric vehicle charged by using the malicious charging spot may be used to charge the malicious electric vehicle at an authorized charging spot; and communication between the electric vehicle and the charging spot is tampered with or information between the electric vehicle and the charging spot is leaked.

Figure 1:
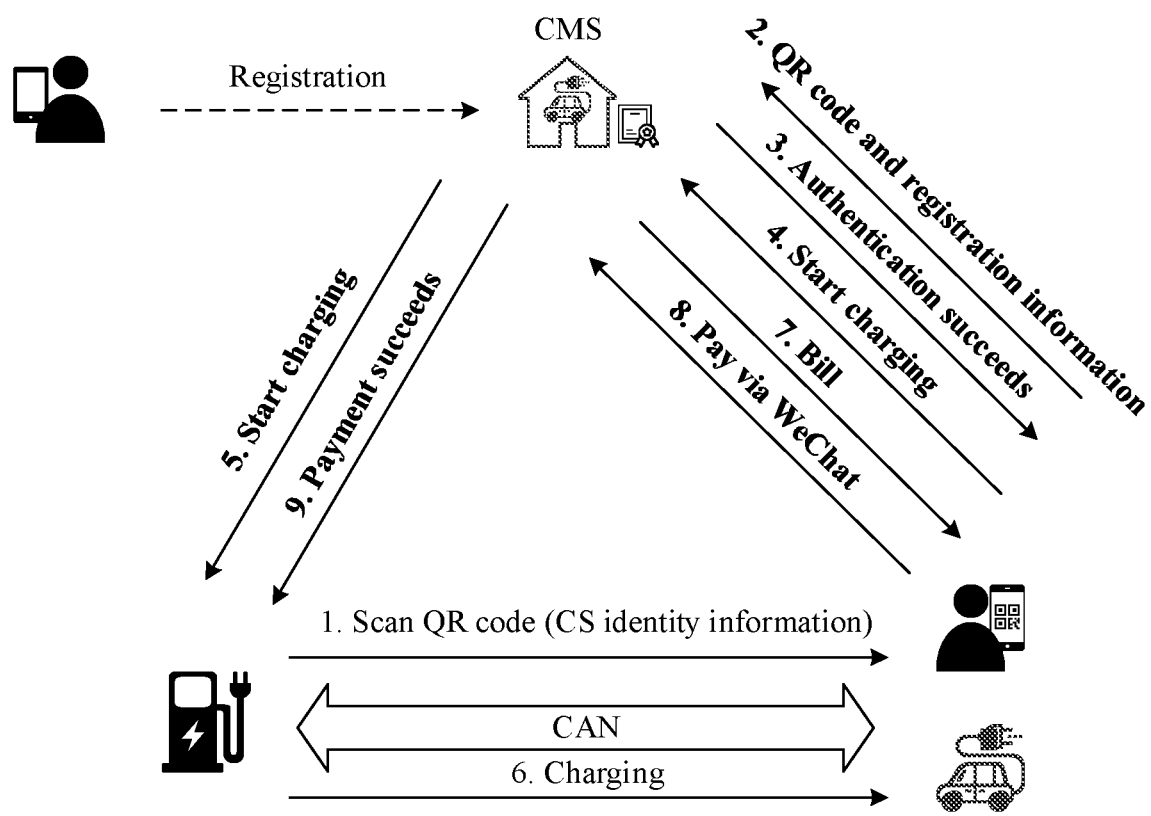
FIG. 1 is a working flowchart of a charging system in which on-site payment is performed by using WECHAT PAY according to an embodiment of this application.

FIG. 1 shows a working process of a charging system in which on-site payment is performed by using WeChat Pay. As shown in FIG. 1, communication is performed between an electric vehicle and a charging spot by using a CAN bus. A user of the electric vehicle needs to register with a charging management system in advance to provide information such as a telephone number and an identity document card number. Then, the user registers a WECHAT PAY account, and installs a mobile phone charging application app that belongs to the charging management system. When the electric vehicle of the user needs to be charged, the mobile phone charging app is first used to scan a two-dimensional code on the charging spot, and the two-dimensional code includes identity information of the charging spot. The mobile phone charging app sends the two-dimensional code and registration information of the user to the charging management system for authentication. After the authentication succeeds, the user sends a charging command to the charging management system. The charging management system forwards the charging command to the charging spot. The charging spot starts to charge the electric vehicle. After the charging ends, the charging management system sends a bill to the user. The user pays charging fees by using WECHAT.

It may be learned from FIG. 1 that, in a charging process, there is no direct authentication between the electric vehicle and the charging spot, and there is an information security mechanism only between the mobile phone charging app of the user and the charging management system.

Figure 2:
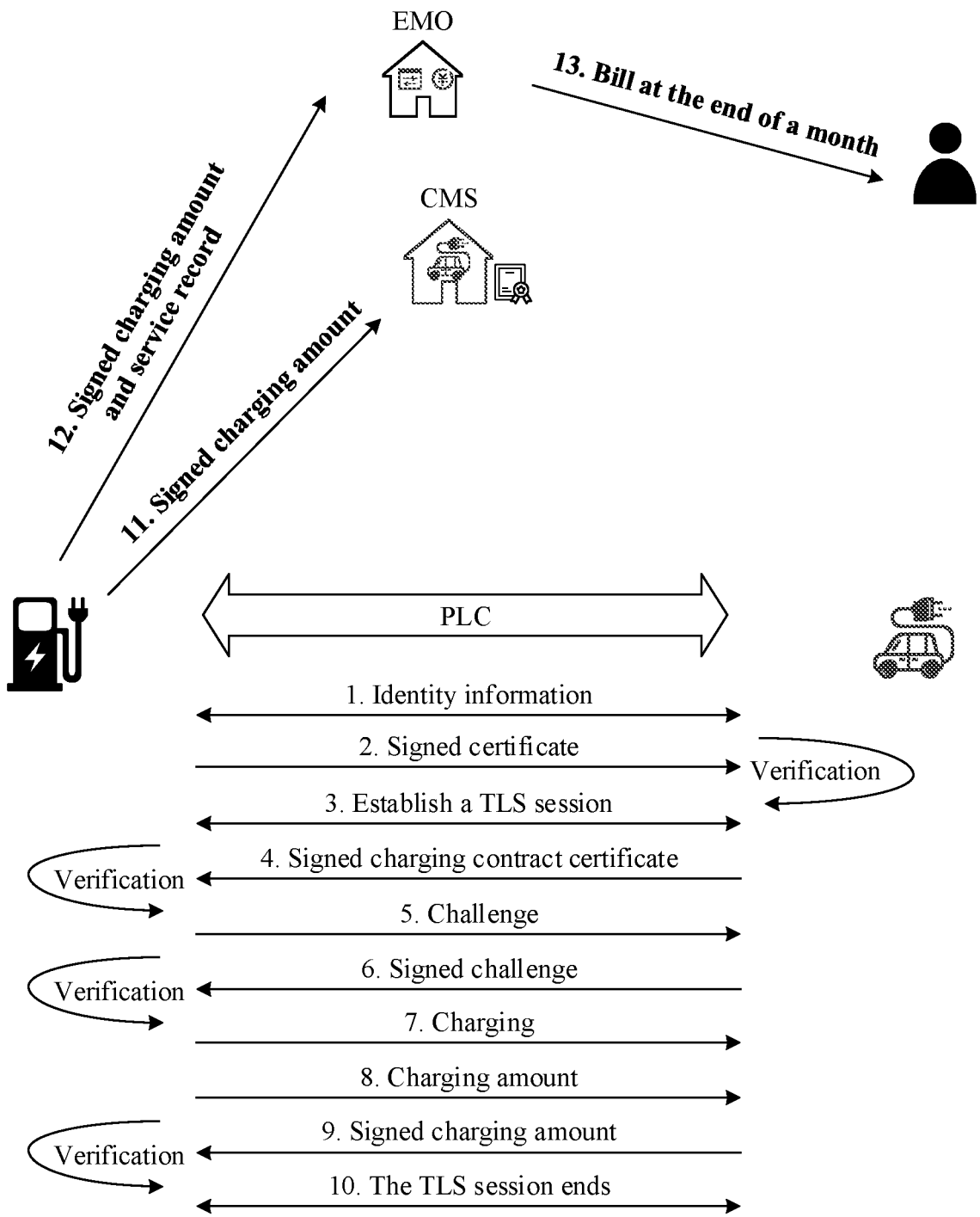
FIG. 2 is a schematic diagram of a charging protocol for billing payment according to an embodiment of this application.

FIG. 2 shows a charging protocol for billing payment. A user of an electric vehicle purchases a charging contract from an electric mobility operator (EMO), and charges the electric vehicle at a charging spot disposed by a charging spot operator (CSO). After the charging, the EMO periodically performs settlement with the user of the electric vehicle and the CSO. FIG. 2 shows a secure communication protocol that is provided by the International Organization for Standardization (ISO) 15118 and in which communication is performed between the electric vehicle and the charging spot by using a programmable logic controller (PLC). A bandwidth of the PLC is greater than a bandwidth of a CAN.

As shown in FIG. 2, the electric vehicle obtains a signed charging contract certificate, namely, a public-private key pair, from the EMO in advance. When it is time to charge, the electric vehicle and the charging spot exchange identity information first, and then exchange respective signed certificates for authentication. After verifying the certificates, the electric vehicle and the charging spot establish a transport layer security (TLS) session. Then, the electric vehicle sends the signed charging contract certificate of the electric vehicle and a certificate chain to the charging spot. The charging spot verifies the certificate, and sends a random challenge to the electric vehicle. The challenge needs to be signed by the electric vehicle by using a private key of the charging contract. After signing the challenge, the electric vehicle sends the challenge back to the charging spot. After successfully verifying the challenge, the charging spot starts charging. After the charging ends, the charging spot sends a charging amount to the electric vehicle. The electric vehicle signs the charging amount, and then sends the charging amount back to the charging spot. The TLS session ends. Finally, the charging spot separately sends the signed charging amount to the charging management system and the EMO as a voucher of the bill.

The charging protocol for billing payment that is provided by the ISO 15118 and that is shown in FIG. 2 is applicable to communication performed between the electric vehicle and the charging spot by using the PLC. Because the bandwidth of the CAN is limited, the charging protocol for billing payment provided by the ISO 15118 is not applicable to communication performed between the electric vehicle and the charging spot by using the CAN.

Therefore, embodiments of this application provide a charging authentication method, so that communication can be performed between an electric vehicle and a charging spot by using a CAN bus, to improve security of communication between the electric vehicle and the charging spot.

Figures 3, 4:
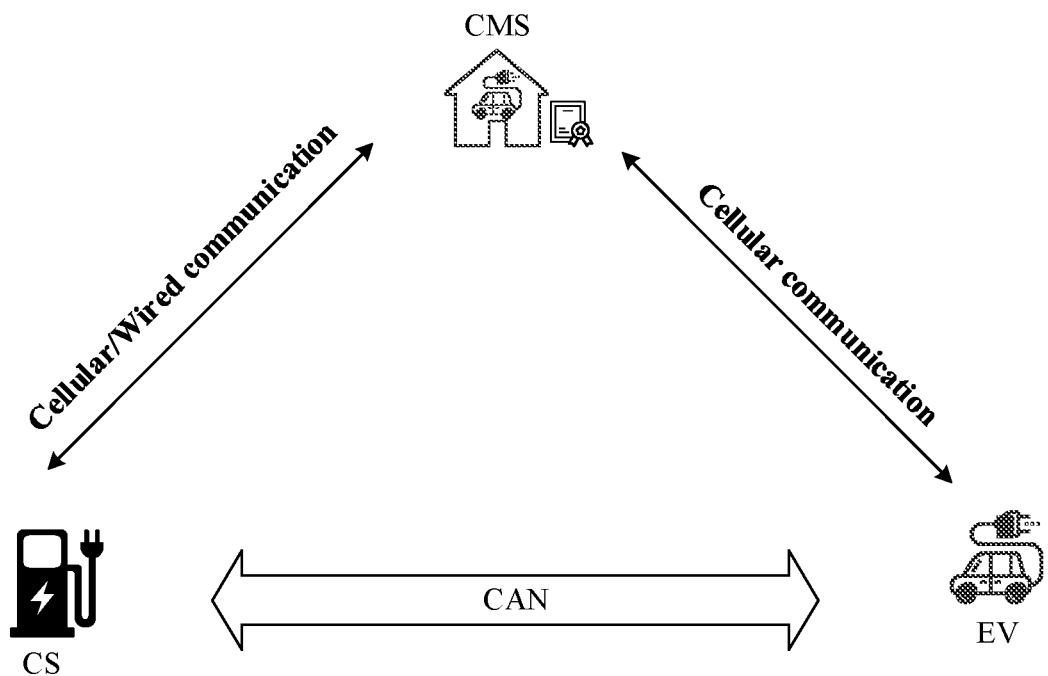
FIG. 3 shows a system architecture of a charging authentication method according to an embodiment of this application.
FIG. 4 is a schematic flowchart of a charging authentication method according to an embodiment of this application.

FIG. 3 shows a system architecture of a charging authentication method according to an embodiment of this application. As shown in FIG. 3, communication is performed between an electric vehicle and a charging spot by using a CAN bus, but a bandwidth of the CAN is limited. Communication is performed between the charging spot and a charging management system by using a cellular network or in a wired manner, and communication is performed between the electric vehicle and the charging management system by using the cellular network. Communication bandwidths in the two sections are rich. It should be understood that the charging management system, the charging spot, and the electric vehicle each have a corresponding network interface, calculation unit, and secure storage unit, have respective public-private key pairs used for a digital signature, and have obtained a public key certificate or a certificate chain from a corresponding certificate authority (CA). A private key needs to be securely stored.

FIG. 4 is a schematic flowchart of a charging authentication method according to an embodiment of this application. The method includes steps 401 and 402. The method in FIG. 4 is performed by an electric vehicle, a first connection is established between the electric vehicle and a charging spot by using a controller area network CAN bus, and a second connection is established between the electric vehicle and a charging management system by using a mobile communication network. The following separately describes the steps.

401. The electric vehicle sends a charging request message to the charging spot by using the first connection.

Optionally, when sending the charging request message to the charging spot by using the first connection, the electric vehicle may further send identity information of the electric vehicle.

402. The electric vehicle performs identity authentication and key negotiation with the charging spot by using the second connection and a third connection between the charging spot and the charging management system.

In an example, the electric vehicle sends a first message to the charging management system by using the second connection, so that the charging management system forwards the first message to the charging spot by using the third connection. Alternatively, the electric vehicle receives a second message forwarded by the charging management system by using the second connection, where the second message is sent by the charging spot to the charging management system by using the third connection.

For example, the second message may include identity information of the charging spot and a random challenge selected by the charging spot. The first message may include a random challenge selected by the electric vehicle and a response to the random challenge of the charging spot. After receiving the random challenge of the electric vehicle, the charging spot may further respond to the random challenge of the electric vehicle. Therefore, the second message may further include a response of the charging spot to the challenge of the electric vehicle. In this embodiment of this application, a replay attack may be avoided based on a challenge/response mechanism, to improve security of information transmission between the charging spot and the electric vehicle.

Optionally, when responding to the random challenge of the electric vehicle, the charging spot may further send a charging parameter to the electric vehicle. The charging parameter includes information such as a voltage and a current that can be provided by the charging spot. Therefore, the second message may further include the charging parameter. The charging spot sends the charging parameter to the electric vehicle, so that the electric vehicle can monitor, in real time in a charging process, whether the charging parameter matches data recorded by the electric vehicle, so that a loss caused by a relay attack can be avoided, to improve security of information transmission between the charging spot and the electric vehicle.

The charging authentication method in this embodiment of this application further includes: The electric vehicle and the charging spot implement key negotiation by using a key exchange algorithm (for example, Diffie-Hellman (DH)). In an example, the electric vehicle generates a DH element (DHE1) of the electric vehicle, and then sends the DHE1 to the charging spot. Therefore, the first message further includes DHE1. DHE1 is an element that is related to a private key of the electric vehicle and that may be disclosed, and may be considered as a public key of the electric vehicle. Similarly, after receiving DHE1 sent by the electric vehicle, the charging spot generates a DH element (DHE2) of the charging spot, and then sends the DHE2 to the electric vehicle. Therefore, the second message further includes DHE2. DHE2 is an element that is related to a private key of the charging spot and that may be disclosed, and may be considered as a public key of the charging spot. After receiving DHE2 sent by the charging spot, the electric vehicle obtains a key K based on DHE1 and DHE2. Similarly, the charging spot also obtains the key K based on DHE1 and DHE2. Therefore, the electric vehicle and the charging spot may obtain a key agreed on through negotiation, and the key may be used to protect subsequent communication between the electric vehicle and the charging spot.

In this embodiment of this application, both the first message and the second message between the electric vehicle and the charging spot are forwarded by the charging management system. After receiving a message sent by the electric vehicle or the charging spot, the charging management system verifies digital signatures of the electric vehicle and the charging spot, and forwards all received messages after successfully verifying the digital signatures.

Optionally, after successfully verifying the digital signatures of the electric vehicle and the charging spot, the charging management system may further replace the digital signature of the electric vehicle and/or the charging spot with a digital signature of the charging management system, and then forward a message obtained after replacement. Before the electric vehicle and the charging spot mutually verify the digital signatures, a digital certificate needs to be verified first. Workload of verifying the digital certificate is large, and the electric vehicle and the charging spot generally already know a public key of the charging management system. Therefore, the electric vehicle and the charging spot do not need to verify the digital certificate of the charging management system, so that workload can be reduced.

FIG. 5 is a schematic flowchart of another charging authentication method according to an embodiment of this application. The method includes steps 501 and 502. The method in FIG. 5 is performed by a charging spot, a first connection is established between the charging spot and an electric vehicle by using a CAN bus, and a third connection is established between the charging spot and a charging management system by using a mobile communication network.

501. The charging spot receives, by using the first connection, a charging request message sent by the electric vehicle.

502. The charging spot performs identity authentication and key negotiation with the electric vehicle by using the third connection and a second connection between the electric vehicle and the charging management system.

The method shown in FIG. 5 is similar to the method shown in FIG. 4. For example descriptions, refer to the foregoing descriptions of steps in FIG. 4. For brevity, details are not described herein again.

An embodiment of this application further provides a charging authentication method, where the method is performed by a charging management system, a second connection is established between the charging management system and an electric vehicle by using a mobile communication network, a third connection is established between the charging management system and a charging spot by using the mobile communication network, a first connection is established between the electric vehicle and the charging spot by using a CAN bus, and the method includes the following.

The charging management system forwards an identity authentication message and a key negotiation message between the electric vehicle and the charging spot by using the second connection and the third connection.

Optionally, the charging management system receives identity information of the charging spot by using the third connection; the charging management system sends the identity information of the charging spot to the electric vehicle by using the second connection; the charging management system receives, by using the second connection, first key information sent by the electric vehicle, where the first key information includes a first key; the charging management system sends the first key information to the charging spot by using the third connection; the charging management system receives, by using the third connection, second key information sent by the charging spot, where the second key information includes a second key; and the charging management system sends the second key information to the electric vehicle by using the second connection, so that the electric vehicle and the charging spot determine a third key based on the first key and the second key, where the third key is a key common to the electric vehicle and the charging spot, and the third key is used to encrypt a message between the electric vehicle and the charging spot.

Optionally, before the charging management system sends the identity information of the charging spot to the electric vehicle by using the second connection, the charging management system successfully verifies the identity information of the charging spot.

Optionally, the first key information further includes a digital signature of the electric vehicle.

Optionally, before the charging management system sends the first key information to the charging spot by using the third connection, the charging management system successfully verifies the digital signature of the electric vehicle, and the charging management system replaces the digital signature of the electric vehicle with a digital signature of the charging management system.

Optionally, the second key information further includes a digital signature of the charging spot.

Optionally, before the charging management system sends the second key information to the electric vehicle by using the second connection, the charging management system successfully verifies the digital signature of the charging spot, and the charging management system replaces the digital signature of the charging spot with the digital signature of the charging management system.

For aspects of the method, refer to the descriptions in FIG. 4. For brevity, details are not described herein again.

Figure 6:
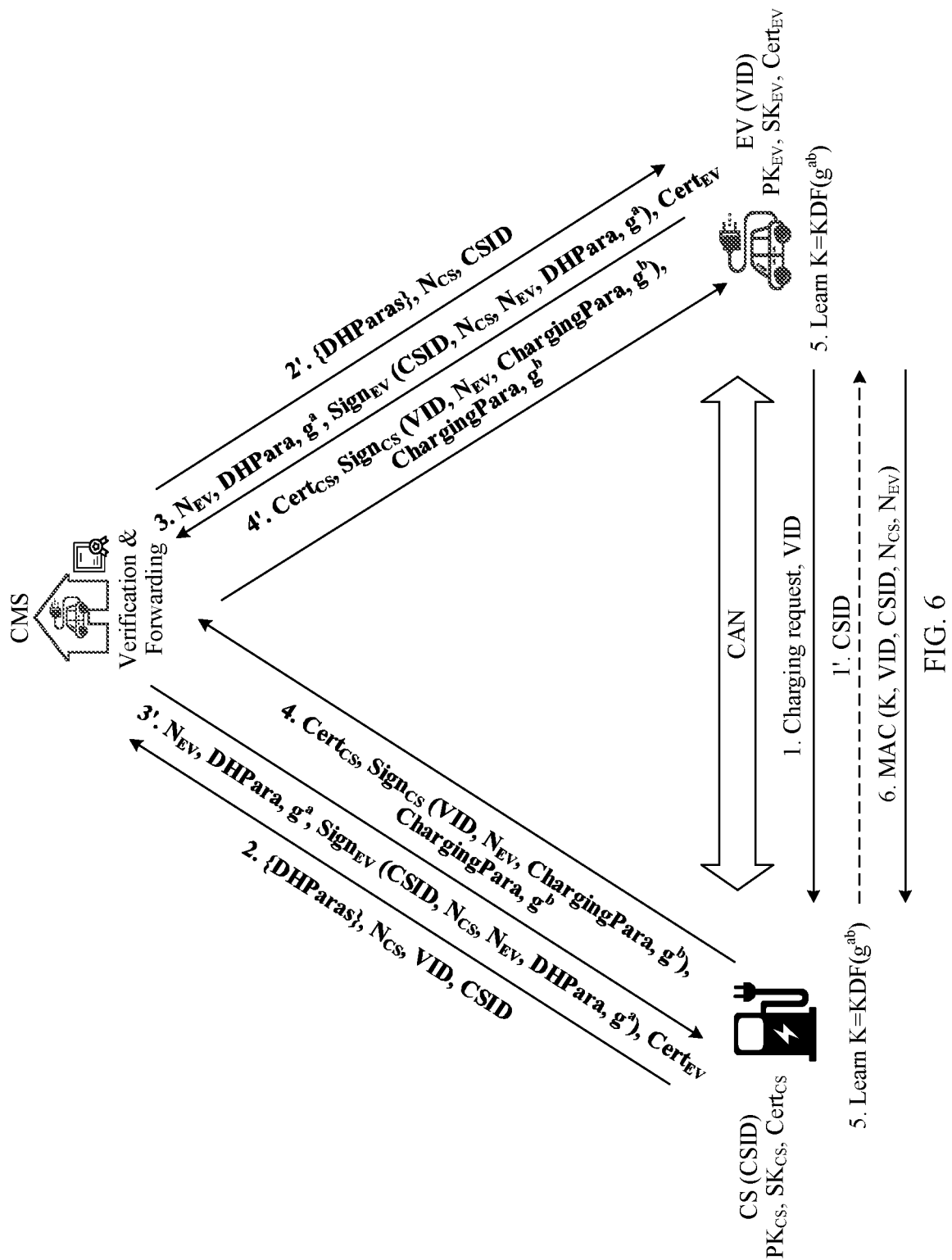
FIG. 6 is a schematic block diagram of a charging authentication method according to an embodiment of this application.

FIG. 6 is a schematic diagram of a charging authentication method according to an embodiment of this application. The method shown in FIG. 6 includes the following steps.

1. After a charging cable between a charging spot and an electric vehicle is connected, the electric vehicle starts an identity authentication protocol and a key negotiation protocol, and sends a charging request ChargingReq and identity information VID to the charging spot. The charging request may be a fixed string, for example, 0000. VID is an identity of the electric vehicle, and needs to be included in a public key certificate $Cert_{EV}$ of the electric vehicle.

1'. Optionally, in response to the foregoing information, the charging spot may send identity information CSID to the electric vehicle, where CSID needs to be included in a public key certificate $Cert_{CS}$ of the charging spot.

2. The charging spot sends the identity information CSID of the charging spot, the received identity information VID of the electric vehicle, a challenge $N_{CS}$, and {DHParas} to a charging management system, and notifies the charging management system that the protocol occurs between the charging spot and the electric vehicle. $N_{CS}$ is a random number with a proper length, for example, 125 bits, and represents a challenge to the electric vehicle. {DHParas} is a key exchange algorithm (DH) parameter set supported by the charging spot. Generally, a group of DH parameters includes a (elliptic curve) group of prime order and a generator g of the group. {DHParas} includes DH parameter groups, supported by all charging spots, for selection by the electric vehicle. The system may define a plurality of groups of DH parameters, so that {DHParas} is a sequence number of each group of DH parameters.

2'. The charging management system forwards CSID, $N_{CS}$, and {DHParas} to the electric vehicle, and notifies the electric vehicle that the electric vehicle needs to reply to the challenge of the charging spot. This embodiment of this application further includes: Before forwarding the foregoing data, the charging management system may further check whether each piece of data is qualified; and if the data is not qualified, the charging management system may request the charging spot to send the data again.

3. After receiving the data forwarded by the charging management system, the electric vehicle replies to the charging management system with $N_{EV}$, DHPara, $g^a$, $Sign_{EV}$ (CSID, $N_{CS}$, $N_{EV}$, DHPara, $g^a$), and $Cert_{EV}$, where $N_{EV}$ is a random challenge selected by the electric vehicle; DHPara is a group of DH parameters that is selected by the electric vehicle from {DHParas} and that is supported by the electric vehicle; $g^a$ is a DH element calculated by the electric vehicle, g is a generator in DHPara, and a is a random index; $Sign_{EV}$ (CSID, $N_{CS}$, $N_{EV}$, DHPara, $g^a$) is a digital signature calculated by the electric vehicle by using a private key, and is a response to the challenge $N_{CS}$ of the charging spot; and $Cert_{EV}$ is a public key digital certificate or a certificate chain of the electric vehicle.

3'. The charging management system verifies the digital signature of the electric vehicle by using $Cert_{EV}$, successfully verifies the digital signature, and then forwards, to the charging spot, all data received by the charging management system.

4. The charging spot verifies the digital signature of the electric vehicle by using $Cert_{EV}$, successfully verifies the digital signature, and then replies to the charging management system with $g^b$, ChargingPara, $Sign_{CS}$ (VID, $N_{EV}$, ChargingPara, and $g^b$), and $Cert_{CS}$. In an example, the charging spot first verifies the digital signature of the electric vehicle by using $Cert_{EV}$, and if the charging spot successfully verifies the digital signature, the charging spot verifies the identity of the electric vehicle, where $g^b$ is a DH element calculated by the charging spot; ChargingPara is a charging parameter that can be provided by the charging spot, for example, a voltage and a current; and $Sign_{CS}$ (VID, $N_{EV}$, ChargingPara, and $g^b$) is a digital signature calculated by the charging spot by using a private key of the charging spot, and is a response to the random challenge $N_{EV}$ of the electric vehicle.

4'. The charging management system verifies the digital signature of the charging spot by using $Cert_{CS}$, successfully verifies the digital signature, and then forwards, to the electric vehicle, all data received by the charging management system.

5. The electric vehicle verifies the digital signature of the charging spot by using the $Cert_{CS}$; successfully verifies the digital signature, and then obtains $(g^b)^a=g^{ab}$=DH $(g^a, g^b)$ through calculation by using a and $g^b$; and then derives a key K by using $g^{ab}$. For example, the key K may be derived by using a key derivation function (KDF). K is used to protect subsequent communication between the electric vehicle and the charging spot. Similarly, in this case, the charging spot may also calculate the key K.

6. The electric vehicle calculates MAC (K, VID, CSID, $N_{CS}$, $N_{EV}$) by using the key K, and sends MAC to the charging spot, to determine the generated key K. MAC is message authentication code. If there is no key K, the MAC value is not forged.

In this embodiment of this application, a replay attack is avoided by using a challenge/response mechanism, key negotiation is implemented by using the key exchange algorithm, identity authentication is performed between the electric vehicle and the charging spot by using the digital signature, there is a sufficient identity authentication mechanism, and a random key is generated to protect subsequent communication. In addition, compared with the charging protocol for billing payment provided by the ISO 15118, information in steps 2, 2', 3, 3', 4, and 4' in this embodiment of this application is forwarded by the charging management system, to implement lightweight communication between the electric vehicle and the charging spot. The method is applicable to communication by using a CAN bus.

Figure 7:
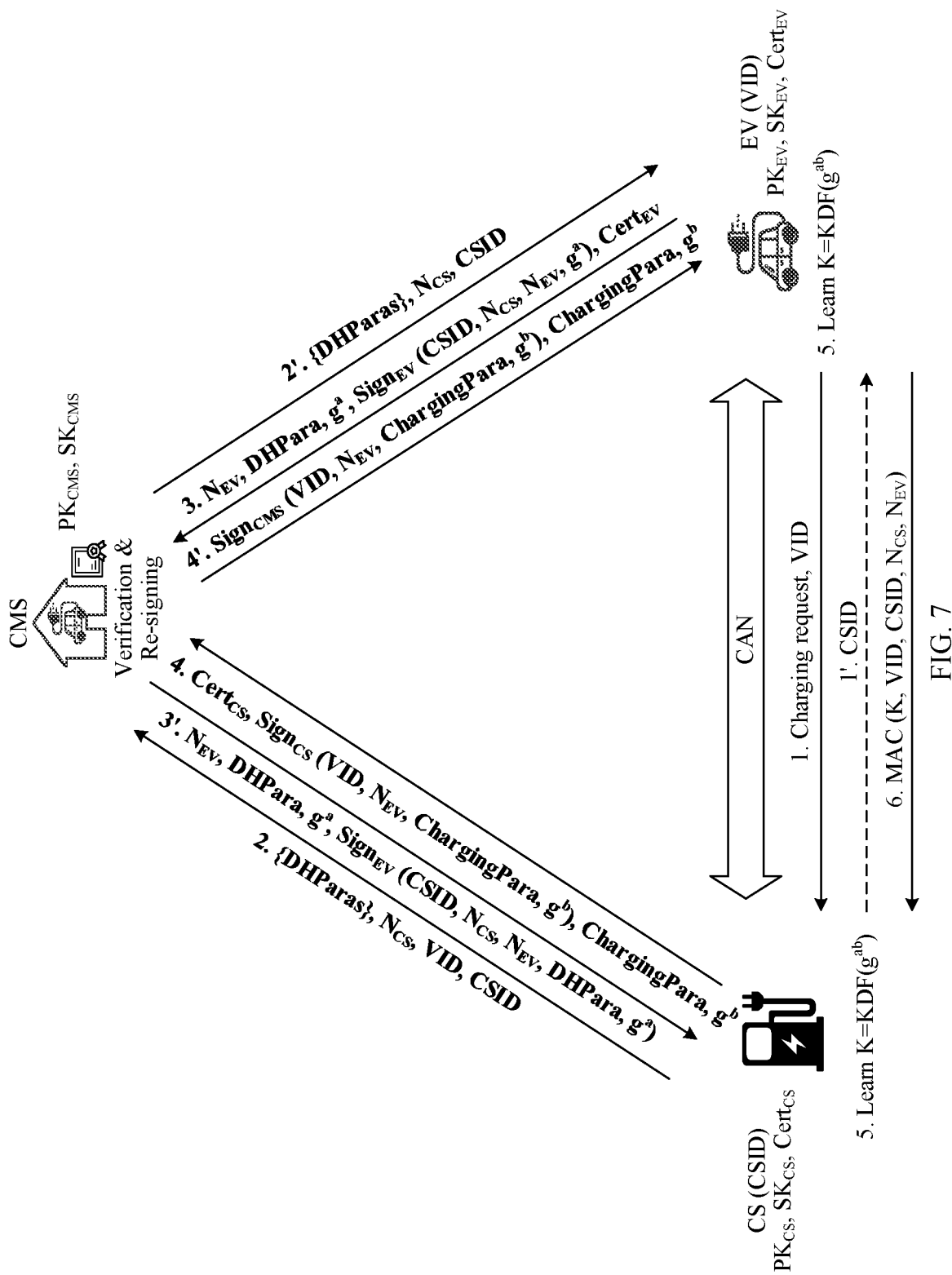
FIG. 7 is a schematic block diagram of another charging authentication method according to an embodiment of this application.

FIG. 7 is a schematic diagram of another charging authentication method according to an embodiment of this application. A charging authentication process shown in FIG. 7 is similar to that shown in FIG. 6, and a difference is as follows:

In step 3' in FIG. 6, after receiving the information sent by the electric vehicle, the charging management system verifies the digital signature of the electric vehicle based on $Cert_{EV}$ of the electric vehicle, successfully verifies the digital signature, and then forwards, to the charging spot, all data received by the charging management system. In step 4 in FIG. 6, the charging spot verifies the digital signature of the electric vehicle by using $Cert_{EV}$. Similarly, in step 4' in FIG. 6, the charging management system verifies the digital signature of the charging spot by using $Cert_{CS}$, successfully verifies the digital signature, and then forwards, to the electric vehicle, all data received by the charging management system. In step 5 in FIG. 6, the electric vehicle verifies the digital signature of the charging spot by using $Cert_{CS}$. In step 3' in FIG. 5, the charging management system verifies the digital signature of the electric vehicle based on $Cert_{EV}$ of the electric vehicle, successfully verifies the digital signature, and then replaces the digital signature of the electric vehicle with a digital signature of the charging management system. In step 4' in FIG. 7, the charging management system verifies the digital signature of the charging spot based on $Cert_{CS}$ of the charging spot, successfully verifies the digital signature, and then replaces the digital signature of the charging spot with the digital signature of the charging management system. It may be learned that, the charging management system is used for verification and forwarding in FIG. 6, and the charging management system is used for verification, re-signing, and forwarding in FIG. 7.

A reason is as follows: When verifying the digital signature of the electric vehicle, the charging spot first needs to verify the certificate of the electric vehicle. In actual application, the certificate chain of the electric vehicle may be very long. As a result, the charging spot may pay a high price to verify the certificate of the electric vehicle. Similarly, the electric vehicle may also pay a high price to verify the certificate of charging spot. Before performing forwarding, the charging management system also verifies the digital signatures of the electric vehicle and the charging spot, and the charging management system has a public-private key pair used for signing. Therefore, the charging authentication method in this embodiment of this application further includes: After successfully verifying the digital signatures of the electric vehicle and the charging spot, the charging management system replaces the digital signatures of the electric vehicle and the charging spot with the digital signature of the charging management system. Because the electric vehicle and the charging spot already know a public key of the charging management system, a certificate of the charging management system does not need to be verified, so that verification workload can be greatly reduced.

Optionally, the charging authentication method in this embodiment of this application further includes: After successfully verifying the digital signatures of the electric vehicle and the charging spot, the charging management system replaces the digital signature of only either the electric vehicle or the charging spot with the digital signature of the charging management system.

Figure 8:
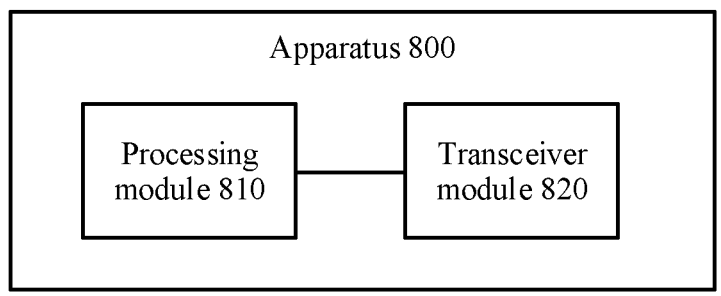
FIG. 8 is a schematic block diagram of a charging authentication apparatus according to an embodiment of this application.

FIG. 8 is a schematic block diagram of a charging authentication apparatus 800 according to an embodiment of this application. The apparatus 800 is configured to perform the method performed by the electric vehicle in the foregoing method embodiment. The apparatus 800 is mounted in the electric vehicle, a first connection is established between the apparatus 800 and a charging spot by using a CAN bus, and a second connection is established between the apparatus 800 and a charging management system by using a mobile communication network. Optionally, a specific form of the apparatus 800 may be a network device or a chip in a network device. This is not limited in this embodiment of this application. The apparatus 800 includes: a transceiver module 820, configured to send a charging request message to the charging spot by using the first connection; and a processing module 810, where the processing module 810 and the transceiver module 820 are further configured to perform identity authentication and key negotiation with the charging spot by using the second connection and a third connection between the charging spot and the charging management system.

In an example, the transceiver module is configured to send identity information of the electric vehicle to the charging spot by using the first connection.

The transceiver module is further configured to receive identity information of the charging spot, where the identity information of the charging spot is forwarded by the charging management system by using the second connection; the transceiver module is further configured to send first key information to the charging spot, where the first key information is forwarded by the charging management system by using the third connection, and the first key information includes a first key; the transceiver module is further configured to receive second key information sent by the charging spot, where the second key information is forwarded by the charging management system by using the second connection, and the second key information includes a second key; and the processing module is configured to determine a third key based on the first key and the second key, where the third key is a key common to the electric vehicle and the charging spot, and the third key is used to encrypt a message between the electric vehicle and the charging spot.

Optionally, the second key information further includes a digital signature of the charging spot.

Optionally, after the transceiver module receives the second key information sent by the charging spot, the processing module is further configured to successfully verify the digital signature of the charging spot.

Optionally, the transceiver module receives the second key information sent by the charging spot, where the digital signature of the charging spot in the second key information is replaced with a digital signature of the charging management system.

It should be understood that the charging authentication apparatus 800 in this embodiment of this application may correspond to the method in FIG. 4 in the foregoing method embodiment, and the foregoing and other management operations and/or functions of the modules in the apparatus 800 are separately intended to implement corresponding steps of the method performed by the electric vehicle in the foregoing method embodiment. Therefore, beneficial effects in the foregoing method embodiment may also be implemented. For brevity, details are not described herein again.

It should be further understood that the modules in the apparatus 800 may be implemented in a form of software and/or hardware. No specific limitation is imposed. In other words, the apparatus 800 is presented in a form of a functional module. The "module" herein may be an application-specific integrated circuit (ASIC), a circuit, a processor that executes one or more software or firmware programs and a memory, an integrated logic circuit, and/or another component capable of providing the foregoing functions. Optionally, in a simple embodiment, a person skilled in the art may figure out that the apparatus 800 may use a form shown in FIG. 9. The processing module 810 may be implemented by using a processor 901 shown in FIG. 9. The transceiver module 820 may be implemented by using a transceiver 903 shown in FIG. 9. In an example, the processor executes a computer program stored in a memory to implement a function of the processing module. Optionally, when the apparatus 800 is a chip, a function and/or an implementation process of the transceiver module 810 may be further implemented by using a pin, a circuit, or the like. Optionally, the memory is a storage unit in the chip, for example, a register or a cache, and the storage unit may be a storage unit that is in a computer device and that is located outside the chip, for example, a memory 902 in FIG. 9.

In terms of hardware implementation, the transceiver module 820 may be a transceiver, and the transceiver (shown as the transceiver module 820 in FIG. 8) forms a communication interface in a communication unit.

Figure 9:
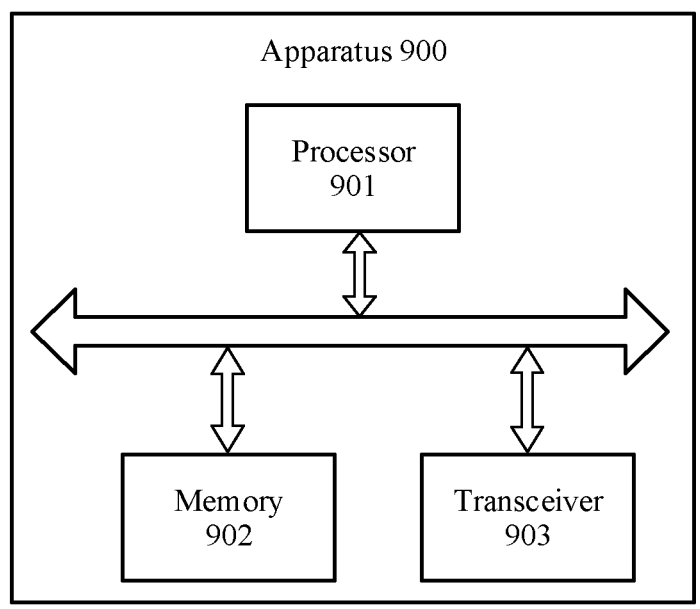
FIG. 9 is a schematic diagram of a structure of a charging authentication apparatus according to an embodiment of this application.

FIG. 9 is a schematic diagram of a structure of a charging authentication apparatus 900 according to an embodiment of this application. As shown in FIG. 9, the apparatus 900 includes a processor 901, and the processor 901 is configured to control and manage a charging authentication action.

It should be understood that the processor 901 may invoke an interface to execute the foregoing sending/receiving action, and the invoked interface may be a logical interface or a physical interface. No limitation is imposed. Optionally, the physical interface may be implemented by using a transceiver. Optionally, the apparatus 900 further includes a transceiver 903.

Optionally, the apparatus 900 further includes a memory 902, and the memory 902 may store program code in the foregoing method embodiment for invoking by the processor 901. The memory 902 may be coupled to the processor 901, or may not be coupled to the processor 901.

In an example, if the apparatus 900 includes the processor 901, the memory 902, and the transceiver 903, the processor 901, the memory 902, and the transceiver 903 communicate with each other by using an internal connection channel to transfer a control signal and/or a data signal. In a possible design, the processor 901, the memory 902, and the transceiver 903 may be implemented by using a chip. The processor 901, the memory 902, and the transceiver 903 may be implemented in a same chip, may be separately implemented in different chips, or any two functions are implemented in one chip. The memory 902 may store program code. The processor 901 invokes the program code stored in the memory 902 to implement a corresponding function of the apparatus 900. It should be understood that the apparatus 900 may be further configured to perform other steps and/or operations performed by the electric vehicle in the foregoing embodiment. For brevity, details are not described herein again.

Figure 10:
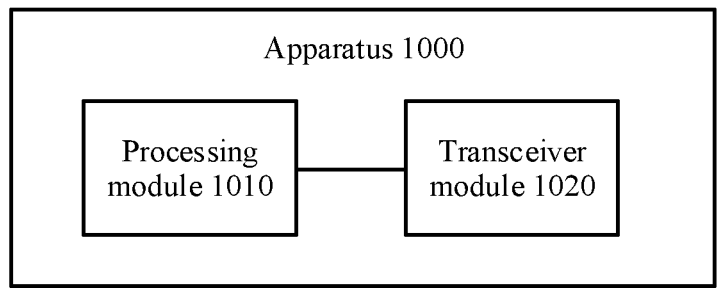
FIG. 10 is a schematic block diagram of another charging authentication apparatus according to an embodiment of this application.

FIG. 10 is a schematic block diagram of a charging authentication apparatus 1000 according to an embodiment of this application. The apparatus 1000 is configured to perform the method performed by the charging spot in the foregoing method embodiment. The apparatus 1000 is mounted in the charging spot, a first connection is established between the apparatus 1000 and an electric vehicle by using a CAN bus, and a second connection is established between the apparatus 1000 and a charging management system by using a mobile communication network. Optionally, a specific form of the apparatus 1000 may be a network device or a chip in a network device. This is not limited in this embodiment of this application. The apparatus 1000 includes: a transceiver module 1020, configured to receive, by using the first connection, a charging request message sent by the electric vehicle; and a processing module 1010, where the processing module 1010 and the transceiver module 1020 are further configured to perform identity authentication and key negotiation with the electric vehicle by using the third connection and a second connection between the electric vehicle and the charging management system.

In an example, the transceiver module is configured to receive, by using the first connection, identity information of the electric vehicle that is sent by the electric vehicle; the transceiver module is further configured to send identity information of the charging spot, where the identity information of the charging spot is forwarded by the charging management system by using the second connection; the transceiver module is further configured to receive first key information sent by the electric vehicle, where the first key information is forwarded by the charging management system by using the third connection, and the first key information includes a first key; the transceiver module is further configured to send second key information to the electric vehicle, where the second key information is forwarded by the charging management system by using the second connection, and the second key information includes a second key; and the processing module is configured to determine a third key based on the first key and the second key, where the third key is a key common to the electric vehicle and the charging spot, and the third key is used to encrypt a message between the electric vehicle and the charging spot.

Optionally, the first key information further includes a digital signature of the electric vehicle.

Optionally, after the transceiver module receives the first key information sent by the electric vehicle, the processing module is further configured to successfully verify the digital signature of the electric vehicle.

Optionally, the transceiver module receives the first key information sent by the electric vehicle, where the digital signature of the electric vehicle in the first key information is replaced with a digital signature of the charging management system.

It should be understood that the charging authentication apparatus 1000 in this embodiment of this application may correspond to the method in FIG. 5 in the foregoing method embodiment, and the foregoing and other management operations and/or functions of the modules in the apparatus 1000 are separately intended to implement corresponding steps of the charging authentication method in the foregoing method embodiment. Therefore, beneficial effects in the foregoing method embodiment may also be implemented. For brevity, details are not described herein again.

It should be further understood that the modules in the apparatus 1000 may be implemented in a form of software and/or hardware. No specific limitation is imposed. In other words, the apparatus 1000 is presented in a form of a functional module. The "module" herein may be an ASIC, a circuit, a processor that executes one or more software or firmware programs and a memory, an integrated logic circuit, and/or another component capable of providing the foregoing functions. Optionally, in a simple embodiment, a person skilled in the art may figure out that the apparatus 1000 may use a form shown in FIG. 11. The processing module 1010 may be implemented by using a processor 1101 shown in FIG. 11. The transceiver module 1020 may be implemented by using a transceiver 1103 shown in FIG. 11. In an example, the processor executes a computer program stored in a memory to implement a function of the processing module. Optionally, when the apparatus 1000 is a chip, a function and/or an implementation process of the transceiver module 1010 may be further implemented by using a pin, a circuit, or the like. Optionally, the memory is a storage unit in the chip, for example, a register or a cache, and the storage unit may be a storage unit that is in a computer device and that is located outside the chip, for example, a memory 1102 in FIG. 11.

In terms of hardware implementation, the transceiver module 1020 may be a transceiver, and the transceiver (shown as the transceiver module 1020 in FIG. 10) forms a communication interface in a communication unit.

Figure 11:
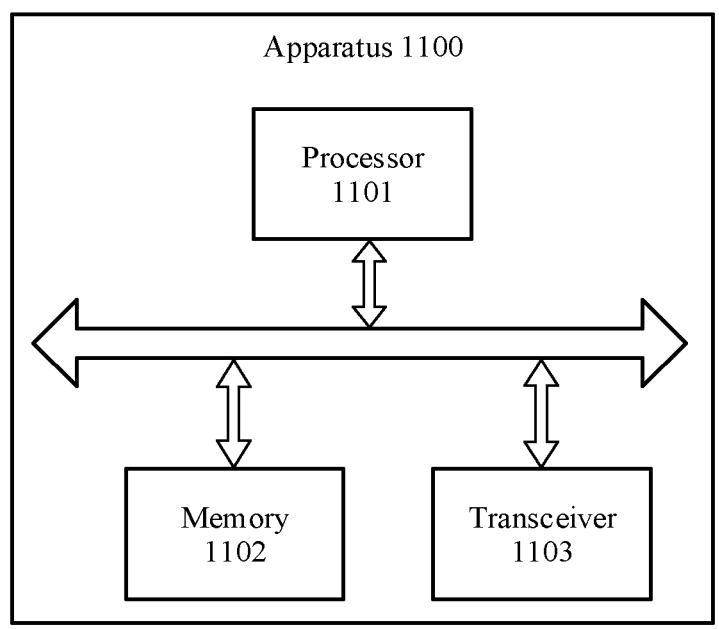
FIG. 11 is a schematic diagram of a structure of another charging authentication apparatus according to an embodiment of this application.

FIG. 11 is a schematic diagram of a structure of a charging authentication apparatus 1100 according to an embodiment of this application. As shown in FIG. 11, the apparatus 1100 includes a processor 1101, and the processor 1101 is configured to control and manage a charging authentication action.

It should be understood that the processor 1101 may invoke an interface to execute the foregoing sending/receiving action, and the invoked interface may be a logical interface or a physical interface. No limitation is imposed.

Optionally, the physical interface may be implemented by using a transceiver. Optionally, the apparatus 1100 further includes a transceiver 1103.

Optionally, the apparatus 1100 further includes a memory 1102, and the memory 1102 may store program code in the foregoing method embodiment for invoking by the processor 1101. The memory 1102 may be coupled to the processor 1101, or may not be coupled to the processor 1101.

In an example, if the apparatus 1100 includes the processor 1101, the memory 1102, and the transceiver 1103, the processor 1101, the memory 1102, and the transceiver 1103 communicate with each other by using an internal connection channel to transfer a control signal and/or a data signal. In a possible design, the processor 1101, the memory 1102, and the transceiver 1103 may be implemented by using a chip. The processor 1101, the memory 1102, and the transceiver 1103 may be implemented in a same chip, may be separately implemented in different chips, or any two functions are implemented in one chip. The memory 1102 may store program code. The processor 1101 invokes the program code stored in the memory 1102 to implement a corresponding function of the apparatus 1100. It should be understood that the apparatus 1100 may be further configured to perform other steps and/or operations performed by the charging spot in the foregoing embodiment. For brevity, details are not described herein again.

Figure 12:
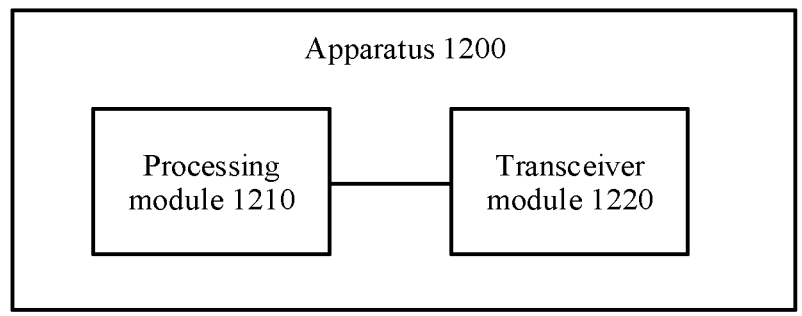
FIG. 12 is a schematic block diagram of still another charging authentication apparatus according to an embodiment of this application.

FIG. 12 is a schematic block diagram of a charging authentication apparatus 1200 according to an embodiment of this application. The apparatus 1200 is configured to perform the method performed by the charging management system in the foregoing method embodiment. The apparatus 1200 is mounted in the charging management system, a second connection is established between the apparatus 1200 and an electric vehicle by using a mobile communication network, a third connection is established between the apparatus 1200 and a charging spot by using the mobile communication network, and a first connection is established between the electric vehicle and the charging spot by using a CAN bus. Optionally, a specific form of the apparatus 1200 may be a network device or a chip in a network device. This is not limited in this embodiment of this application. The apparatus 1200 includes: a transceiver module 1220, configured to forward an identity authentication message and a key negotiation message between the electric vehicle and the charging spot by using the second connection and the third connection.

In an example, the transceiver module is configured to receive identity information of the charging spot by using the third connection; the transceiver module is further configured to send the identity information of the charging spot to the electric vehicle by using the second connection; the transceiver module is further configured to receive, by using the second connection, first key information sent by the electric vehicle, where the first key information includes a first key; the transceiver module is further configured to send the first key information to the charging spot by using the third connection; the transceiver module is further configured to receive, by using the third connection, second key information sent by the charging spot, where the second key information includes a second key; and the transceiver module is further configured to send the second key information to the electric vehicle by using the second connection, so that the electric vehicle and the charging spot determine a third key based on the first key and the second key, where the third key is a key common to the electric vehicle and the charging spot, and the third key is used to encrypt a message between the electric vehicle and the charging spot.

Optionally, before the transceiver module sends the identity information of the charging spot to the electric vehicle by using the second connection, the apparatus further includes a processing module 1210, configured to successfully verify the identity information of the charging spot.

Optionally, the first key information further includes a digital signature of the electric vehicle.

Optionally, before the transceiver module sends the first key information to the charging spot by using the third connection, the apparatus further includes the processing module, configured to successfully verify the digital signature of the electric vehicle; and the processing module is further configured to replace the digital signature of the electric vehicle with a digital signature of the charging management system.

Optionally, the second key information further includes a digital signature of the charging spot.

Optionally, before the transceiver module sends the second key information to the electric vehicle by using the second connection, the apparatus further includes the processing module, used by the charging management system to successfully verify the digital signature of the charging spot; and the processing module is further configured to replace the digital signature of the charging spot with the digital signature of the charging management system.

It should be understood that the charging authentication apparatus 1200 in this embodiment of this application may correspond to the method performed by the charging management system in the foregoing method embodiment, and the foregoing and other management operations and/or functions of the modules in the apparatus 1200 are separately intended to implement corresponding steps of the charging authentication method in the foregoing method embodiment. Therefore, beneficial effects in the foregoing method embodiment may also be implemented. For brevity, details are not described herein again.

It should be further understood that the modules in the apparatus 1200 may be implemented in a form of software and/or hardware. No specific limitation is imposed. In other words, the apparatus 1200 is presented in a form of a functional module. The "module" herein may be an ASIC, a circuit, a processor that executes one or more software or firmware programs and a memory, an integrated logic circuit, and/or another component capable of providing the foregoing functions. Optionally, in a simple embodiment, a person skilled in the art may figure out that the apparatus 1200 may use a form shown in FIG. 13. The processing module 1210 may be implemented by using a processor 1301 shown in FIG. 13. The transceiver module 1220 may be implemented by using a transceiver 1303 shown in FIG. 13. In an example, the processor executes a computer program stored in a memory to implement a function of the processing module. Optionally, when the apparatus 1200 is a chip, a function and/or an implementation process of the transceiver module 1210 may be further implemented by using a pin, a circuit, or the like. Optionally, the memory is a storage unit in the chip, for example, a register or a cache, and the storage unit may be a storage unit that is in a computer device and that is located outside the chip, for example, a memory 1302 in FIG. 13.

In terms of hardware implementation, the transceiver module 1220 may be a transceiver, and the transceiver (shown as the transceiver module 1220 in FIG. 12) forms a communication interface in a communication unit.

Figure 13:
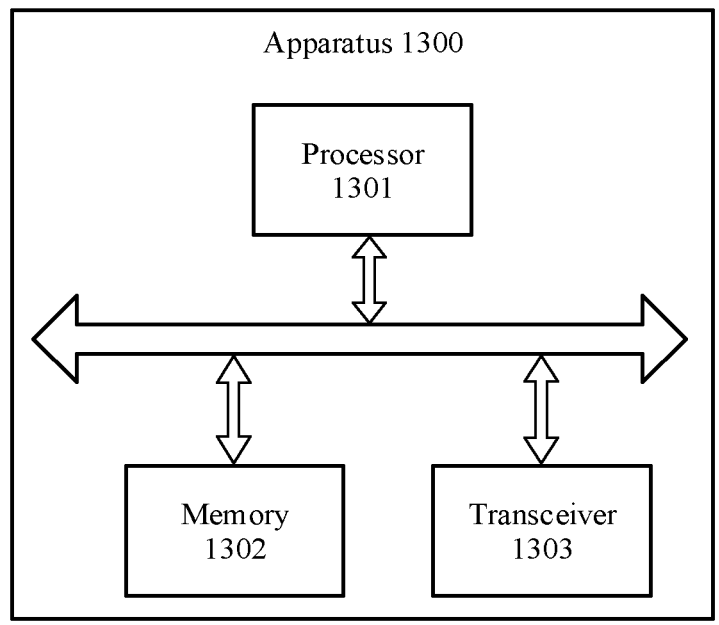
FIG. 13 is a schematic diagram of a structure of still another charging authentication apparatus according to an embodiment of this application.

FIG. 13 is a schematic diagram of a structure of a charging authentication apparatus 1300 according to an embodiment of this application. As shown in FIG. 13, the apparatus 1300 includes a processor 1301, and the processor 1301 is configured to control and manage a charging authentication action.

It should be understood that the processor 1301 may invoke an interface to execute the foregoing sending/receiving action, and the invoked interface may be a logical interface or a physical interface. No limitation is imposed. Optionally, the physical interface may be implemented by using a transceiver. Optionally, the apparatus 1300 further includes a transceiver 1303.

Optionally, the apparatus 1300 further includes a memory 1302, and the memory 1302 may store program code in the foregoing method embodiment for invoking by the processor 1301. The memory 1302 may be coupled to the processor 1301, or may not be coupled to the processor 1301.

In an example, if the apparatus 1300 includes the processor 1301, the memory 1302, and the transceiver 1303, the processor 1301, the memory 1302, and the transceiver 1303 communicate with each other by using an internal connection channel to transfer a control signal and/or a data signal. In a possible design, the processor 1301, the memory 1302, and the transceiver 1303 may be implemented by using a chip. The processor 1301, the memory 1302, and the transceiver 1303 may be implemented in a same chip, may be separately implemented in different chips, or any two functions are implemented in one chip. The memory 1302 may store program code. The processor 1301 invokes the program code stored in the memory 1302 to implement a corresponding function of the apparatus 1300. It should be understood that the apparatus 1300 may be further configured to perform other steps and/or operations performed by the charging spot in the foregoing embodiment. For brevity, details are not described herein again.

The method disclosed in the foregoing embodiment of this application may be applied to the processor, or may be implemented by the processor. The processor may be an integrated circuit chip and has a signal processing capability. In an implementation process, steps in the foregoing method embodiments can be implemented by using a hardware integrated logical circuit in the processor, or by using instructions in a form of software.

The foregoing processor may be a general purpose processor, a digital signal processor (DSP), an ASIC, a field programmable gate array (FPGA) or another programmable logic device, a discrete gate or a transistor logic device, or a discrete hardware assembly, or may be a system on chip (SoC), or may be a central processing unit (CPU), or may be a network processor (NP), or may be a digital signal processor (DSP), or may be a micro control unit (MCU), or may be a programmable logic device (PLD) or another integrated chip. The processor may implement or perform the methods, steps, and logical block diagrams that are disclosed in embodiments of this application. The general purpose processor may be a microprocessor or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), used as an external cache. Through example but not limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a SynchLink DRAM (SLDRAM), and a direct Rambus RAM (DR RAM). It should be noted that the memory of the systems and methods described in this specification includes but is not limited to these memories and any memory of another appropriate type.

It should be understood that numbers "first", "second", and the like in embodiments of this application are merely used to distinguish between different objects, for example, distinguish between different time differences, positioning reference signals, or the like, and are not intended to limit the scope of the embodiments of this application. This is not limited in the embodiments of this application.

It should also be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Unless otherwise specified, a meaning of an expression similar to "an item includes one or more of the following: A, B, and C" appearing in this application generally means that the item may be any one of the following: A; B; C; A and B; A and C; B and C; A, B, and C; A and A; A, A, and A; A, A, and B; A, A, and C; A, A, and B; A, C, and C; B and B; B, B, and B; B, B, and C; C and C; C, C, and C; and another combination of A, B, and C. Three elements A, B, and C are used as an example above to describe an optional entry of the item. When the expression is "the item includes at least one of the following: A, B, . . . , and X", that is, when there are more elements in the expression, an entry to which the item is applicable may also be obtained according to the foregoing rule.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electric vehicle, comprising:
   a processor; and
   a memory coupled to the processor and configured to store program instructions that when executed by the processor cause the electric vehicle to be configured to:
   establish a first connection between the electric vehicle and a charging spot via a controller area network (CAN) bus;
   send a charging request message to the charging spot via the first connection;
   establish a second connection between the electric vehicle and a charging management system via a mobile communication network;
   send first identity information of the electric vehicle to the charging spot via the first connection;
   receive second identity information of the charging spot from the charging management system via the second connection;
   send first key information to the charging spot, wherein the electric vehicle receives the first key information from the charging management system via a third connection, wherein the first key information comprises a first key, and wherein the third connection is between the charging spot and the charging management system;
   receive second key information of the charging spot, wherein the electric vehicle receives the second key information from the charging management system via the second connection, and wherein the second key information comprises a second key; and
   determine a third key based on the first key and the second key, wherein the third key is common to the electric vehicle and the charging spot, and wherein the third key is configured to encrypt a message between the electric vehicle and the charging spot.

2. The electric vehicle of claim 1, wherein the second key information further comprises a first digital signature of the charging spot.

3. The electric vehicle of claim 2, wherein the program instructions further cause the electric vehicle to be configured to successfully verify the first digital signature.

4. The electric vehicle of claim 2, wherein the program instructions further cause the electric vehicle to be configured to:
   receive the second key information from the charging spot; and
   replace the first digital signature with a second digital signature of the charging management system.

5. The electric vehicle of claim 1, wherein the program instructions further cause the electric vehicle to implement key negotiation with the charging spot via a key exchange algorithm.

6. The electric vehicle of claim 1, wherein the first key and the second key are based on a Diffie-Hellman key exchange.

7. A charging spot, comprising:
   a processor; and
   a memory coupled to the processor and configured to store program instructions that when executed by the processor cause the charging spot to be configured to:
   establish a first connection between the charging spot and an electric vehicle via a controller area network (CAN) bus;
   receive, a charging request message from the electric vehicle via the first connection;
   establish a second connection between the charging spot and a charging management system via a mobile communication network;
   receive, from the electric vehicle, first identity information of the electric vehicle via the first connection;
   send second identity information of the charging spot to the charging management system for forwarding by the charging management system via a third connection, wherein the third connection is between the electric vehicle and the charging management system;
   receive first key information from the electric vehicle, wherein the charging spot receives the first key information from the charging management system via the second connection, wherein the first key information comprises a first key;

send second key information to the electric vehicle, wherein the charging spot receives the second key information is from the charging management system via the third connection, and wherein the second key information comprises a second key; and determine a third key based on the first key and the second key, wherein the third key is common to the electric vehicle and the charging spot, and wherein the third key is configured to encrypt a message between the electric vehicle and the charging spot.

8. The charging spot of claim 7, wherein the first key information further comprises a first digital signature of the electric vehicle.

9. The charging spot of claim 8, wherein the program instructions further cause the charging spot to be configured to successfully verify the first digital signature.

10. The charging spot of claim 8, wherein the program instructions further cause the charging spot to be configured to:

receive the first key information from the electric vehicle; and replace the first digital signature with a second digital signature of the charging management system.

11. The charging spot of claim 7, wherein the first key and the second key are based on a Diffie-Hellman key exchange.

12. A charging management system, comprising:

a processor; and a memory coupled to the processor and configured to store program instructions that when executed by the processor cause the charging management system to be configured to:

establish a first connection between the charging management system and an electric vehicle via a mobile communication network;

establish a second connection between the charging management system and a charging spot via the mobile communication network;

receive identity information of the charging spot via the second connection;

send the identity information to the electric vehicle via the first connection;

receive first key information from the electric vehicle via the first connection, wherein the first key information comprises a first key;

send the first key information to the charging spot via the second connection;

receive second key information from the charging spot via the second connection, wherein the second key information comprises a second key; and send the second key information to the electric vehicle via the first connection, wherein a third key is common to the electric vehicle and the charging spot and is based on the first key and the second key, and wherein the third key enables encrypting a message between the electric vehicle and the charging spot.

13. The charging management system of claim 12, wherein the program instructions further cause the charging management system to be configured to successfully verify the identity information.

14. The charging management system of claim 12, wherein the first key information further comprises a first digital signature of the electric vehicle.

15. The charging management system of claim 14, wherein the program instructions further cause the charging management system to be configured to:

successfully verify the first digital signature; and replace the first digital signature with a second digital signature of the charging management system.

16. The charging management system of claim 12, wherein the second key information further comprises a first digital signature of the charging spot.

17. The charging management system of claim 16, wherein the program instructions further cause the charging management system to be configured to:

successfully verify the first digital signature; and replace the first digital signature with a second digital signature of the charging management system.

18. The charging management system of claim 12, wherein the program instructions further cause the charging management system to be configured to forward identity authentication messages between the electric vehicle and the charging spot.

19. The charging management system of claim 12, wherein the program instructions further cause the charging management system to be configured to forward key negotiation messages between the electric vehicle and the charging spot.

20. The charging management system of claim 12, wherein the first key and the second key are based on a Diffie-Hellman key exchange.

* * * * *